United States Patent [19]
Dumas et al.

[11] Patent Number: 5,132,695
[45] Date of Patent: Jul. 21, 1992

[54] RADIO NAVIGATION SYSTEM

[75] Inventors: Bernard Dumas, Bievres; Léon P. Robin, Massy, both of France

[73] Assignee: Thomson CSF, Paris, France

[21] Appl. No.: 645,314

[22] Filed: Jan. 24, 1991

Related U.S. Application Data

[63] Continuation of Ser. No. 550,222, Jul. 10, 1990, abandoned, which is a continuation of Ser. No. 304,274, Jan. 31, 1989, abandoned.

[30] Foreign Application Priority Data

Feb. 1, 1988 [FR] France .................. 8801111

[51] Int. Cl.$^5$ .................................................. G01S 3/02
[52] U.S. Cl. ..................................... 342/461; 342/451; 364/458
[58] Field of Search .................. 342/457, 451, 461; 364/458

[56] References Cited

U.S. PATENT DOCUMENTS 3,710,331  1/1973  Kiisk .
3,953,856  4/1976  Hammack .
3,996,590  12/1976  Hammack .
4,672,382  6/1987  Fukuhara et al. .
4,731,613  3/1988  Endo et al. .

FOREIGN PATENT DOCUMENTS 0163345  12/1985  European Pat. Off. .
2538560  6/1984   France .
8707030  11/1987  World Int. Prop. O. .

OTHER PUBLICATIONS

NTC'83-IEEE 1983 National Telesystems Conference, "Space Systems For The National Well-Being And Security" Nov. 1983, pp. 226-238 J. L. Arnold, et al GPS/INS Integration For Range Instrumentation.

Primary Examiner—Theodore M. Blum
Attorney, Agent, or Firm—Oblon, Spivak, McClelland, Maier & Neustadt

[57] ABSTRACT

A radio navigation system including:

a means to determine, at a point ($M_1$) of the trajectory of a moving body to be localized, the speed vector of said moving body and, possible, the "n" order derivatives of said speed vector (with $n > 1$), a means to perform at least three successive measurements of distance, respective between a geodesic point at the ground and three successive positions ($M_1$, $M_2$, $M_3$) of said moving body, a means to computer the position ($M_3$) of said moving body by resolving a system of equations from the results thus obtained, expressed in one and the same reference system.

8 Claims, 4 Drawing Sheets

RADIO NAVIGATION SYSTEM

This application is a continuation of application Ser. No. 07/550,222 filed on Jul. 10, 1990, now abandoned, which is a continuation of application Ser. No. 07/304,274 filed Jan. 31, 1989, now abandoned.

BACKGROUND OF THE INVENTION

1. Field of the Invention

The present invention concerns a radio navigation system.

2. Description of the Prior Art

At present there are two known types of radio navigation systems based on time-referenced measurements: the so-called global systems (for example the Global Positioning System or GPS) and the so-called localized systems (for example the Trident system).

The GPS system works with a receiver borne by the moving body (land-based moving body or aircraft) to be localized and transmitters borne by several satellites. The position of the moving body is identified by cross-checking several measurements of distance from a certain number (generally 3 or 4) of these satellites, each distance measurement being made by measuring the time between the transmission and the reception of one and the same signal, using one and the same time reference (for example synchronized clocks). Each satellite, in its message, provides models relative to its trajectory (ephemeris) and to the behaviour of its clock. In fact, the rough distance measured, or pseudo-distance, is vitiated by various errors such as those due to fluctuations in propagation or to the drift of the clocks. However, the former error can be reduced very substantially by comparison with a well-defined, geodesically fixed receiver (differential measurement).

The main drawback of the GPS system, however, lies in the fact that, given the mobility of the element to be localized, and the relatively long periods of time taken for propagation, acquisition, computation, etc. used in this system, it does not give the real position of the moving body in real time, but a predicted position on the basis of positions determined previously. This drawback becomes all the more appreciable as the moving body moves quickly.

The Trident system, on the contrary, using geodesic points on the ground, fitted with responder beacons, enables the real-time, high-precision localization of a moving body fitted out with an interrogator. The position of the moving body is also identified by the cross-checking of several measurements of distance from several beacons, each distance measurement being performed by measuring the time between interrogations and responses.

By contrast, the Trident system has the drawback of requiring a large number of beacons (generally about 30) on the ground and not having wide coverage due to the fact that the responder beacons are located on the ground and due to the order of magnitude of the radio-electrical wavelengths used.

SUMMARY OF THE INVENTION

An object of the present invention is a radio navigation system by which it is possible to obtain high precision in real time while, at the same time, requiring a small amount of equipment both on the ground and on board the moving body.

An object of the present invention is a radio navigation system comprising:

means to determine, at a point ($M_1$) of the trajectory of a moving body to be localized, the speed vector of said moving body and, possibly, the "n" order derivatives of said speed vector (with $n \leq 1$);

means to perform at least three successive measurements of distance, respectively between a geodesic point at the ground and three successive positions ($M_1$, $M_2$ $M_3$) of said moving body;

means to compute the position ($M_3$) of said moving body by resolving a system of equations from the results thus obtained expressed in one and the same reference system.

BRIEF DESCRIPTION OF THE DRAWINGS

Other features and characteristics of the present invention will appear more clearly from the following description of embodiments, made with reference to the appended drawings, of which.

DESCRIPTION OF PREFERRED EMBODIMENTS

Figure 1:
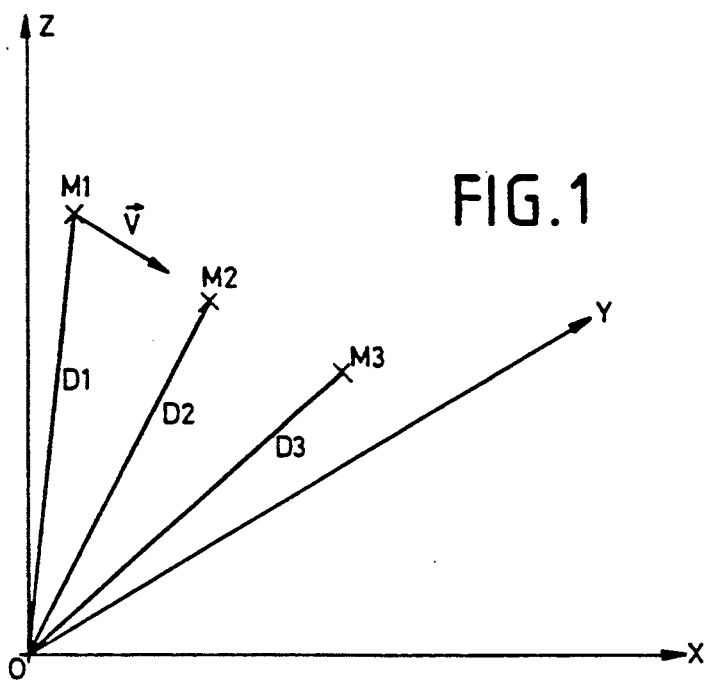
FIG. 1 is a graph designed to illustrate the principle of the invention.

In FIG. 1, $X_i$, $Y_i$, $Z_i$ designate the Cartesian coordinates of the moving body M in the geodesic trihedron OXYZ at the instants $t_i$, and $D_i$ designates the distance OM at these very same instants. In this same reference, the speed vector V of the moving body M has components $V_x$, $V_y$, $V_z$. We can assume:

$$\Delta T = t_{i+1} - t_i.$$

As will be seen, the problem of determining the position of the moving body may be entirely resolved with a value of i equal to 3.

For, the following circular equations can be written:

$$X_1^2 + Y_1^2 + Z_1^2 = D_1^2 \tag{1}$$

$$X_2^2 + Y_2^2 + Z_2^2 = D_2^2 \tag{2}$$

$$X_3^2 + Y_3^2 + Z_3^2 = D_3^2 \tag{3}$$

Assuming that, during the time interval from $t_1$ to $t_3$, the speed vector remains invariable, the equations (2) and (3) are written:

$$(X_1 + V_x \Delta t)^2 + (Y_1 + V_y \Delta t)^2 + (Z_1 + V_z \Delta t)^2 = D_2^2 \tag{3}$$

$$(X_1 + 2V_x \Delta t)^2 + (Y_1 + 2V_y \Delta t)^2 + (Z_1 + 2V_z \Delta t)^2 = D_3^2 \tag{4}$$

$D_1$, $D_2$ $D_3$ and $V(V_x, V_y, V_z)$ being measured, the relationships (1) (3) and (4) unambiguously determine the coordinates $X_1$, $Y_1$, $Z_1$ of the moving body at the instant $t_1$, whence $X_2$, $Y_2$, $Z_2$ and $X_3$, $Y_3$, $Z_3$ at the instants $t_2$ and $t_3$.

To determine the entire trajectory, it is possible to proceed by iteration and perform the same measurements and the same computation at the instants $t_2$, $t_3$, $t_4$ ... etc. After two time intervals $\Delta t$, there will thus be, with a slight delay, three measurements of the position of the moving body at the same sampled instants. This enables the measurement to be made more precise by statistical considerations.

The components of the speed vector $\vec{V}$ may be given, for example, by a gyroscopic or gyrometrical unit (a standard or laser unit) with which the moving body is fitted out. They may also be obtained by using a global radio navigation system such as the GPS system, in which case a GPS receiver is provided for on board the moving body. The measurements of distance may be done by means of a Trident interrogating/responding set.

Figure 2:
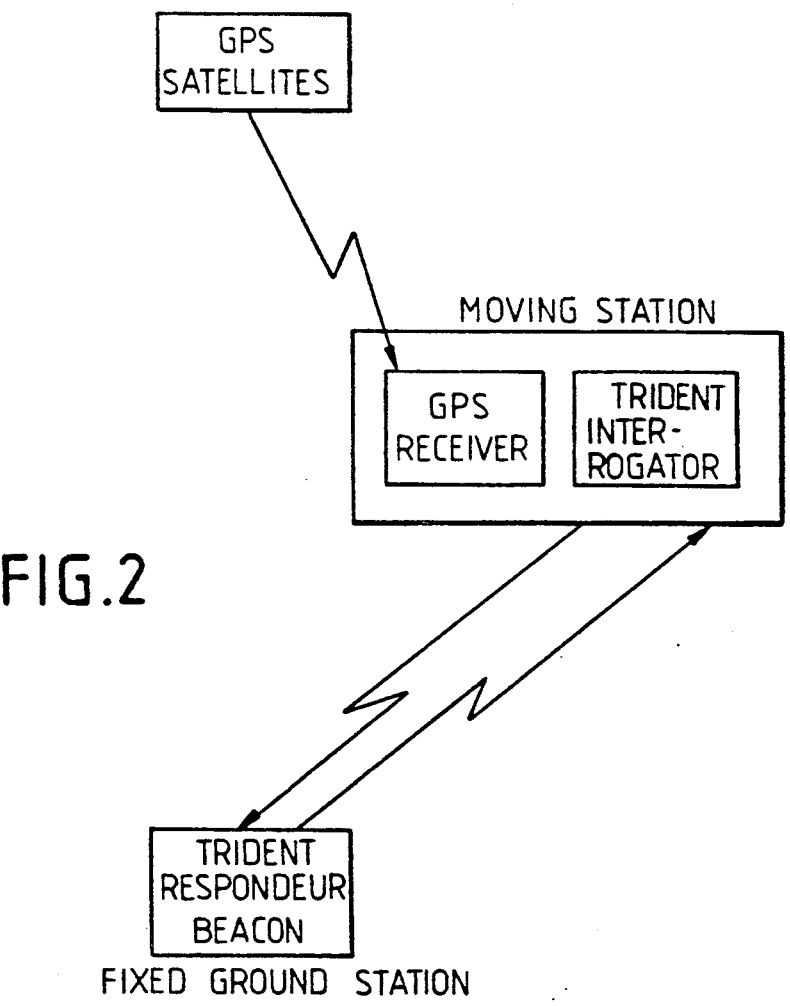
FIG. 2 is a diagram of a radio navigation system according to a first embodiment of the invention.

These latter two possibilities correspond to the diagram of FIG. 2.

In this case, the basic navigation equipment of the moving body therefore comprises a GPS receiver and a Trident transmission/reception (interrogator) set. As compared with the case where the Trident system will be used separately, the ground station may have only one responder beacon.

The on-board GPS receiver gives the filtered speed vector, from successive positions of the moving body, according to prior art techniques. The measurement of each of these successive positions themselves require three successive distance measurements from three geodesically defined satellites. The Trident interrogator/beacon set gives the distance between the ground station and the moving body.

Figure 3:
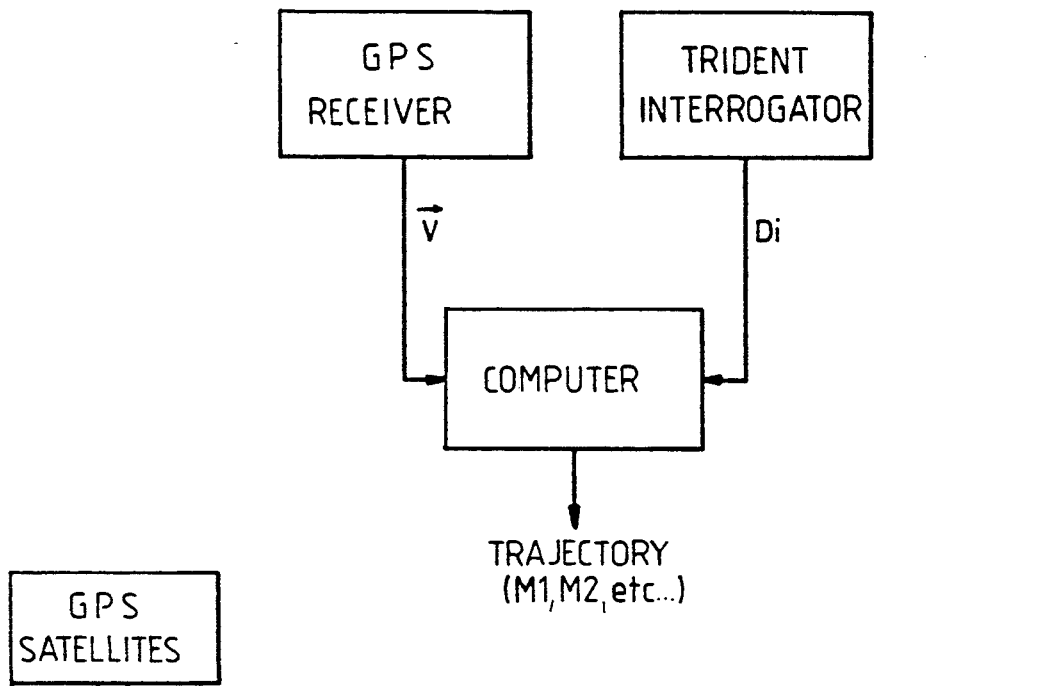
FIG. 3 is a diagram of the equipment fitted into the moving body to be localized.

The position of the moving body, after n successive measurements ($n \geq 3$) as described above, is computed by an on-board computer which can be seen in FIG. 3, which represents the on-board equipment of the moving body.

The trajectory is tracked at the renewal rate of the distance information, i.e. herein the working rate of the Trident system.

The renewal rate of the speed information is the working rate of the GPS system. This value is prepared on the basis of a number of prior points which may be a compromise between the value of the measuring noise and the speed of variation of the speed vector.

Figure 4:
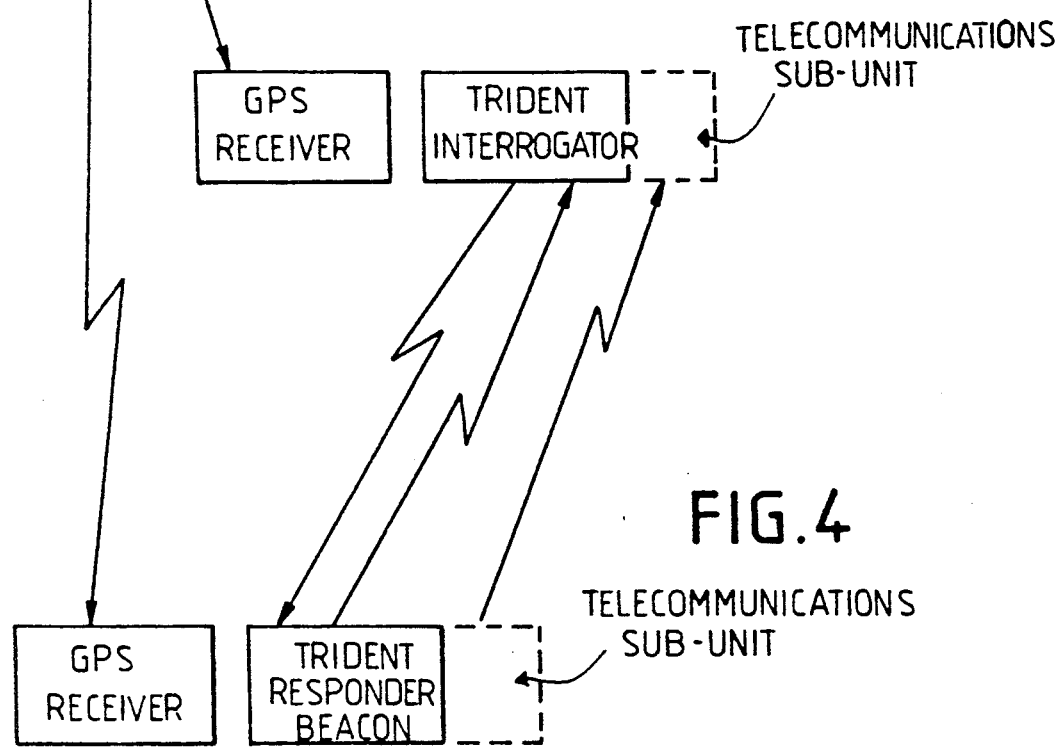
FIG. 4 is a diagram of a radio navigation system according to a second embodiment of the invention.

FIG. 4 shows an alternative embodiment corresponding to the working of the GPS system in differential mode. As recalled in the introduction, this method increases the precision with which the moving body is positioned while, at the same time, removing the need to synchronize the satellite/receiver clocks. The above-described system is then completed as follows: the ground station comprises, in addition to the Trident responder beacon, a GPS receiver. Besides, a telecommunications system (with ground transmitter and receiver on board the moving body) enabling the transmission of differential data, is added to the Trident interrogator/responder set, it being possible to limit the transmitter of this telecommunications system to a particular working mode of the beacon and the receiver to a data reception channel integrated into the Trident interrogator/receiver.

The GPS system could be replaced by any other global radio navigation system such as LORAN, OMEGA, DECCA resulting in a fairly precise filtered speed while, at the same time, giving precision in terms of distance which may be far smaller than that given by the localized systems.

The Trident system could be replaced by any other system that measures distance with high precision and could be derived from primary and secondary radio type equipment, or lidar. By way of example, we might cite the DME, 1.06$\mu$ laser telemeter, 10.6$\mu$ laser telemeter systems.

Moreover, the restriction of the described method to a motion which is rectilinear and uniform during two sampling intervals may be lifted if the kinematic elements of the trajectory, of an order greater than 1, are assumed to be known. In general, if a trajectory is curved and determined locally by means of kinematic elements (vector derivations) up to the nth order, we can write:

$$M(t + \Delta t) - M(t) = \frac{dM}{dt} \Delta t + \frac{1}{2} \frac{d^2M}{dt^2} \Delta t^2 + \frac{1}{6} \frac{d^3M}{dt^3} \Delta t^3 + \ldots \frac{1}{n} \frac{d^nM}{dt^n} \Delta t^n$$

(development limited to the first n terms; the error is smaller than any arbitrary value provided that $$\left| \frac{d^nM}{dt^n} \right|$$

remains smaller than a certain value and $\Delta t/n$ is small enough):

$$M(t + \Delta t) - M(t) = V\Delta t + \frac{\gamma}{2} \Delta t^2 + \ldots \quad (5)$$

If, at the instant t, there are filtered elements of the trajectory available, namely speed $\vec{V}$, acceleration $\gamma$ and, possibly, higher order vector derivatives, then it possible to write, similarly, in projecting (5) for example on the X axis:

$$X_2 = X_1 + V_x\Delta t + \frac{\gamma_x}{2} \Delta t^2 + \left(\frac{d^3M}{dt^3}\right)_x \frac{\Delta t^3}{3!} + \ldots \quad (6)$$

and $$\left(X_1 + V_x\Delta t + \frac{\gamma_x}{2} \Delta t^2 + \ldots \right) + \quad (7)$$

$$\left(Y_1 + V_y\Delta t + \frac{\gamma_y}{2} \Delta t^2 + \ldots \right) +$$

$$\left(Z_1 + V_z\Delta t + \frac{\gamma_z}{2} \Delta t^2 + \ldots \right) = D_2^2$$

$$\left[X_1 + 2V_x\Delta t + \frac{\gamma_x}{2} (2\Delta t)^2 + \ldots \right]^2 + \quad (8)$$

$$\left[Y_1 + 2V_y\Delta t + \frac{\gamma_y}{2} (2\Delta t)^2 + \ldots \right]^2 +$$

$$\left(Z_1 + 2V_z\Delta t + \frac{\gamma_z}{2} (2\Delta t)^2 + \ldots \right) = D_3^2$$

-continued and always $X_1^2 + Y_1^2 + Z_1^2 = D_1^2$     (1)

The equations (7) (8) and (1) make it possible, $\bar{V}$, $\gamma$, ... $d^n\bar{M}/dt^n$ and $\Delta p$ being known, to determine $X_1$, $Y_1$, $Z_1$ at the instant $T_1$ as well as $X_2$, $Y_2$, $Z_2$ and $X_3$, $Y_3$, $Z_3$ at the instants $$t_2 = t_1 + \Delta t \text{ and } t_3 = t_1 + 2\Delta t.$$

As an example, in the case of rectilinear trajectory with informly accelerated motion, there would be $d^n M/dt^n = 0$ from n=3 onwards, and $\gamma$ independent of t.

In the case of a circular trajectory with load factor $|\gamma| = kg$, there would be:

$$\frac{d^2M}{dt^2} = -OMw^2 = \gamma$$

$$\frac{d^3M}{dt^3} = -\frac{dM}{dt}w^2 = -Vw^2$$

$$\frac{d^4M}{dt^4} = -\frac{dM}{dt}w^2 = -\frac{d^2M}{dt^2}w^2 = -\gamma w^2$$

$$\frac{d^5M}{dt^5} = -\frac{d^3M}{dt^3}w^2 = Vw^4$$

$$\frac{d^6M}{dt^6} = -\frac{d^4M}{dt^4}w^2 = \gamma w^4$$

All the vector derivatives can be expressed as a function of $\bar{V}$, $\gamma$ and w (angular speed). As w=

$$\left|\frac{\gamma}{V}\right|,$$

all the elements of the trajectory can be expressed as a function of two parameters V (curvilinear speed) and $\gamma$ (load factor). These two elements alone can, moreover, be kept for a second order approximation of the trajectory.

The above equations (1) (7) and (8) can be written in the form:

$$\begin{cases} X_1^2 + Y_1^2 + Z_1^2 = D_1^2 & (1) \\ (X_1 + A)^2 + (Y_1 + B)^2 + (Z_1 + C)^2 = D_2^2 & (10) \\ (X_1 + A')^2 + (Y_1 + B')^2 + (Z_1 + C')^2 = D_3^2 & (11) \end{cases}$$

with $$\begin{cases} X_2 = X_1 + A;\ Y_2 = Y_1 + B;\ Z_2 = Z_1 + C & (12) \\ X_3 = X_1 + A';\ Y_3 = Y_1 + B';\ Z_3 = Z_1 + C' & (13) \end{cases}$$

and $$\begin{cases} A = V_x\Delta t + \frac{\gamma_x}{2}\Delta t^2 + \frac{1}{3!}\Delta t^3\left(\frac{d^3M}{dt^3}\right)_x + \dots & (14) \\ B = V_y\Delta t + \frac{\gamma_y}{2}\Delta t^2 + \dots & (15) \\ C = V_z\Delta t + \frac{\gamma_z}{2}\Delta t^2 + \dots & (16) \end{cases}$$

-continued $$\begin{cases} A' = 2V_x\Delta t + \frac{\gamma_x}{2}\Delta t^2 + \frac{1}{3!}(2\Delta t)^3\left(\frac{d^3M}{dt^3}\right)_x + \dots & (17) \\ B' = 2V_y\Delta t + \frac{\gamma_y}{2}(2\Delta t)^2 + \dots & (18) \\ C' = 2V_z\Delta t + \frac{\gamma_z}{2}(2\Delta t)^2 + \dots & (19) \end{cases}$$

The equations (10) and (11) can be reduced to the linear forms:

$$\begin{cases} AX_1 + BY_1 + CZ_1 = \alpha \\ A'X_1 + B'Y_1 + C'Z_1 = \beta \end{cases}$$

in assuming:

$$2\alpha = D_2^2 - D_1^2 - (A^2 + B^2 + C^2)^2 \quad (20)$$

$$2\beta = D_3^2 - D_1^2 - (A'^2 + B'^2 + C'^2)^2 \quad (21)$$

whence:

$$X_1 = \frac{\begin{vmatrix} \alpha - CZ_1 & B \\ \beta - C'Z_1 & B' \end{vmatrix}}{\Delta} \quad (22)$$

$$Y_1 = \frac{\begin{vmatrix} A & \alpha - CZ_1 \\ A' & \beta - C'Z_1 \end{vmatrix}}{\Delta} \quad (23)$$

with $\Delta = AB' - A'B$

(22) and (23) can be developed $$\begin{cases} X_1 = \frac{Z_1(BC' - B'C) + \alpha B' - \beta B}{\Delta} \\ Y_1 = \frac{Z_1(C A' - C'A) + \beta A - \alpha A'}{\Delta} \end{cases}$$

or $$\begin{cases} X_1 = rZ_1 + s & (24) \\ Y_1 = r'Z_1 + s' & (25) \end{cases}$$

in assuming $$\begin{cases} r = \frac{BC' - B'C}{\Delta} \\ r' = \frac{CA' - C'A}{\Delta} \end{cases} \begin{cases} s = \frac{\alpha B' - \beta B}{\Delta} \\ s' = \frac{\beta A - \alpha A'}{\Delta} \end{cases}$$

the substitution in (1) then leads to the equation:

$$(rZ_1 + s)^2 + (r'Z_1 + s')^2 = D_1^2 - Z_1^2$$

or $$Z_1^2(r^2 + r'^2 + 1) + 2Z_1(rs + r's') + s^2 + s'^2 - D_1^2 = 0$$

which can be put in the form:

$$aZ_1^2 + 2bZ_1 + C = 0$$

whence the solutions:

$$Z_1 = \frac{-b \pm \sqrt{\delta}}{a} \quad (27)$$

with $\delta = b^2 - ac$ in recalling that:

$$\begin{cases} a = r^2 + r'^2 + 1 \\ b = rs + r's' \\ c = s^2 + s'^2 - D_1^2 \end{cases} \quad (28)$$

From the equations (24) and (25) we then decode $X_1$, $Y_1$.

From the equations (12) and (13), we deduce $X_2$, $Y_2$, $Z_2$, $X_3$, $Y_3$, $Z_3$.

The ambiguity can be lifted by continuity.

The following are the different computation steps:

1) computation of A, B, C, A', B', C' from $\Delta t$ onwards and from:

$$V(V_x, V_y, V_z), (\gamma_x, \gamma_y, \gamma_z), \frac{d^3 M}{dt^3}, \ldots \frac{d^n M}{dt^n}$$

(equations 14 to 19)

(2) computation of $\Delta$ and from (26) (28) and $D_1$ onwards, computation of: r, r', s, s', a, b, c and $\delta$ 3) computation of $\alpha$ and $\beta$ by the equations (20) and (21)

4) computation of $Z_1$ by (27)

(5) computation of $X_1$ and $Y_1$ from (22) and (23) onwards 6) computation of $X_2$, $Y_2$, $Z_2$, $X_3$, $Y_3$, $Z_3$ by (12) and (13).

Figure 5:
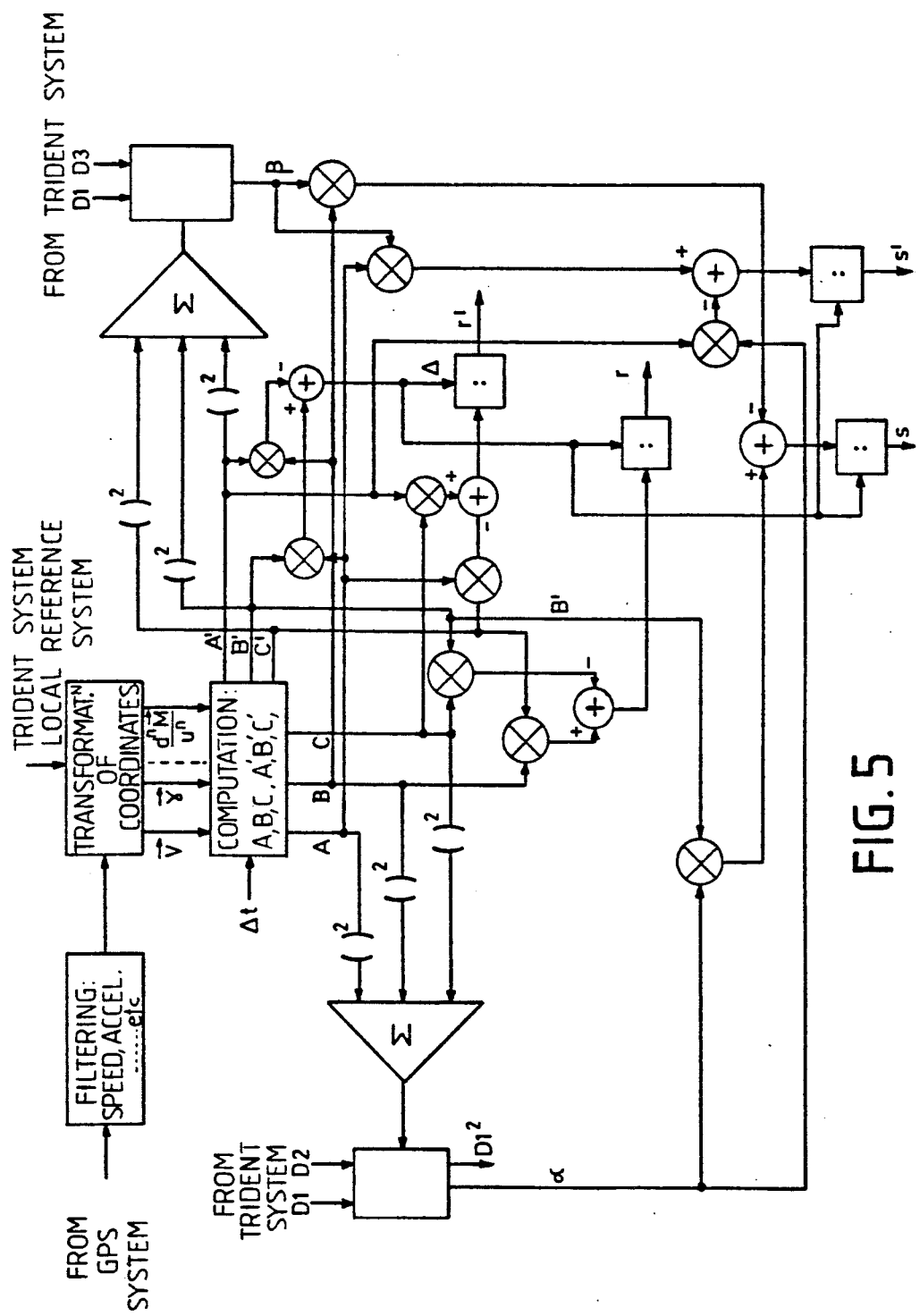
FIGS. 5 and 6 are examples of implementation of the computation of position of the moving body, done according to the invention.
Figure 6:
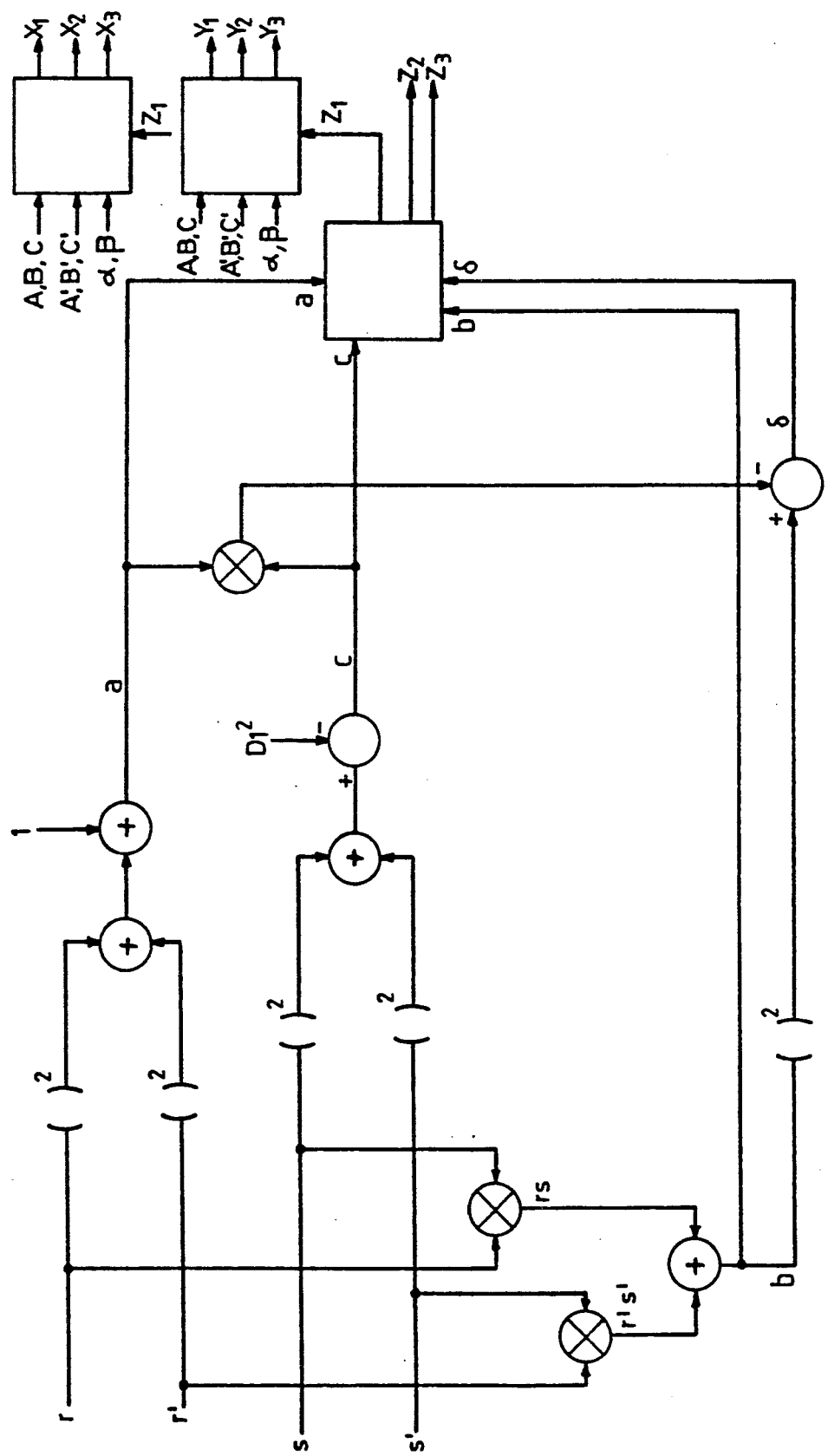

FIGS. 5 and 6 are examples of the application of the above computations. These figures also show a coordinate transformer used to express, in the geodesic reference system related to the Trident system, the coordinates of the speed, acceleration and other vectors given by the GPS system in a reference system related to it.

What is claimed is:

1. A radio navigation system comprising:
   means to determine, at a point ($M_1$) of the trajectory of a moving body to be localized the speed vector of said moving body and the "n" order derivatives of said speed vector (with n > 1);
   means including an interrogator-responder set to perform at least three successive measurements of distance in real time with respect to a single reference, respectively between a geodesic point at the ground where said responder is located and three successive positions ($M_1$, $M_2$, $M_3$) of said moving body, by measuring the time between interrogations made by said moving body and the responses of said responder;
   means to compute the position ($M_3$) of said moving body by resolving a system of equations from the results thus obtained, expressed in said single reference system.

2. A system according to claim 1, wherein the means to determine said speed vector and the "n" order derivatives of said vector comprise a gyroscopic unit placed aboard said moving body.

3. A system according to claim 1, wherein the means to determine said speed vector and the "n" order
   of said vector, comprises means to estimate the cartesian coordinates of said moving body on the basis of previous position measurements of said moving body, done in a global type of radio navigation system.

4. A system according to claim 3, wherein said global type radio navigation system consists of the GPS system, said moving body being fitted with an GPS receiver.

5. A system according to claim 1, wherein said means to perform distance measurements comprise an Trident interrogator-responder set, said interrogator being placed on board said moving body and said responder at said geodesic point on the ground.

6. A system according to claim 5, wherein said geodesic point on the ground is also fitted out with a GPS receiver in order to set up a differential GPS system which outputs differentiate information and wherein means to transmit the said differential information thus obtained are provided between said geodesic point on the ground and said moving body.

7. A system according to claim 6, wherein said means to perform distance measurements comprise a Trident interrogator-responder set, said interrogator being placed on board said moving body and said responder at said geodesic point on the ground, and wherein the transmission of said differential information is limited to a particular working mode of said Trident responder.

8. A system according to claim 6, wherein said means to perform distance measurements comprise a Trident interrogator-responder set, said interrogator being placed on board said moving body and said responder at said geodesic point on the ground, and wherein the reception of said differential information is done by means of a data reception channel integrated into said Trident interrogator-receiver.

* * * * *